(12) United States Patent
Yanagisawa

(10) Patent No.: US 12,461,414 B2
(45) Date of Patent: Nov. 4, 2025

(54) LIQUID CRYSTAL DEVICE COMPRISING AN ADSORPTION LAYER CONTAINING XEROGEL

(71) Applicant: SEIKO EPSON CORPORATION, Tokyo (JP)

(72) Inventor: Tatsuya Yanagisawa, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 13 days.

(21) Appl. No.: 18/611,702

(22) Filed: Mar. 21, 2024

(65) Prior Publication Data
US 2024/0319543 A1 Sep. 26, 2024

(30) Foreign Application Priority Data
Mar. 22, 2023 (JP) .................. 2023-045623

(51) Int. Cl.
*G02F 1/1339* (2006.01)
*G02F 1/1337* (2006.01)

(52) U.S. Cl.
CPC ...... *G02F 1/1339* (2013.01); *G02F 1/133734* (2013.01); *G02F 2201/123* (2013.01)

(58) Field of Classification Search
CPC ................................. G02F 1/133734
See application file for complete search history.

(56) References Cited

U.S. PATENT DOCUMENTS 6,392,334 B1 * 5/2002 Alwan .............. H01J 29/86
313/493
2015/0253610 A1 * 9/2015 Sung .............. G02F 1/13452
349/150
2020/0363668 A1 * 11/2020 Yamada .............. G02F 1/1339

FOREIGN PATENT DOCUMENTS

| JP | H07209631 | 8/1995 |
| JP | 2007140008 | 6/2007 |
| JP | 2020187213 | 11/2020 |

\* cited by examiner

*Primary Examiner* — Paul C Lee
(74) *Attorney, Agent, or Firm* — JCIPRNET

(57) ABSTRACT

A liquid crystal display device includes a first substrate, a second substrate, a seal material disposed between the first substrate and the second substrate at a periphery in plan view, a liquid crystal layer disposed between the first substrate and the second substrate and an inside surrounded by the seal material in plan view, and an adsorption layer containing xerogel disposed along at least part of the seal material.

11 Claims, 6 Drawing Sheets

LIQUID CRYSTAL DEVICE COMPRISING AN ADSORPTION LAYER CONTAINING XEROGEL

The present application is based on, and claims priority from JP Application Serial Number 2023-045623, filed Mar. 22, 2023, the disclosure of which is hereby incorporated by reference herein in its entirety.

BACKGROUND

1. Technical Field

The present disclosure relates to a liquid crystal device and an electronic apparatus.

2. Related Art

Hitherto, as a liquid crystal device, there has been proposed a configuration in which a circulation flow path for circulating liquid crystals provided inside a seal material is constituted of the seal material and a partition wall, and the circulation flow path is provided with a forced circulation device that forcibly flows the liquid crystals in the circulation flow path and has higher adsorption property for ions than a display area.

However, the liquid crystal device disclosed in JP-A-2020-187213 requires a space large enough to provide a circulation path, so problems to be solved include reducing a display area and increasing a size of a panel.

SUMMARY

According to an aspect of the present disclosure, there is provided a liquid crystal device including a first substrate, a second substrate, a seal material disposed between the first substrate and the second substrate, a liquid crystal layer disposed between the first substrate and the second substrate and an inside surrounded by the seal material in plan view, and an adsorption layer containing xerogel disposed along at least part of the seal material.

According to another aspect of the present disclosure, there is provided a liquid crystal device including a first substrate, a second substrate, a seal material disposed between the first substrate and the second substrate, a liquid crystal layer disposed between the first substrate and the second substrate and an inside surrounded by the seal material in plan view, a pixel electrode disposed between the first substrate and the liquid crystal layer, a dummy pixel electrode disposed closer to the seal material than the pixel electrode, and an adsorption layer containing xerogel disposed between the pixel electrode and the dummy pixel electrode in plan view.

According to another aspect of the present disclosure, there is provided a liquid crystal device including a first substrate, a second substrate, a liquid crystal layer disposed between the first substrate and the second substrate, a first pixel electrode disposed between the first substrate and the liquid crystal layer, a second pixel electrode disposed between the first substrate and the liquid crystal layer and disposed in parallel with the first pixel electrode in plan view, and an adsorption layer containing xerogel disposed between the first pixel electrode and the second pixel electrode in plan view.

According to another aspect of the present disclosure, there is provided an electronic apparatus including the liquid crystal device described above.

DESCRIPTION OF EMBODIMENTS

First Embodiment

An embodiment of the present disclosure will be described below with reference to the accompanying drawings. Note that in the following drawings, the dimensions of components may be scaled differently for the sake of clarity of the components.

Overall Configuration of Liquid Crystal Device

Figure 1:
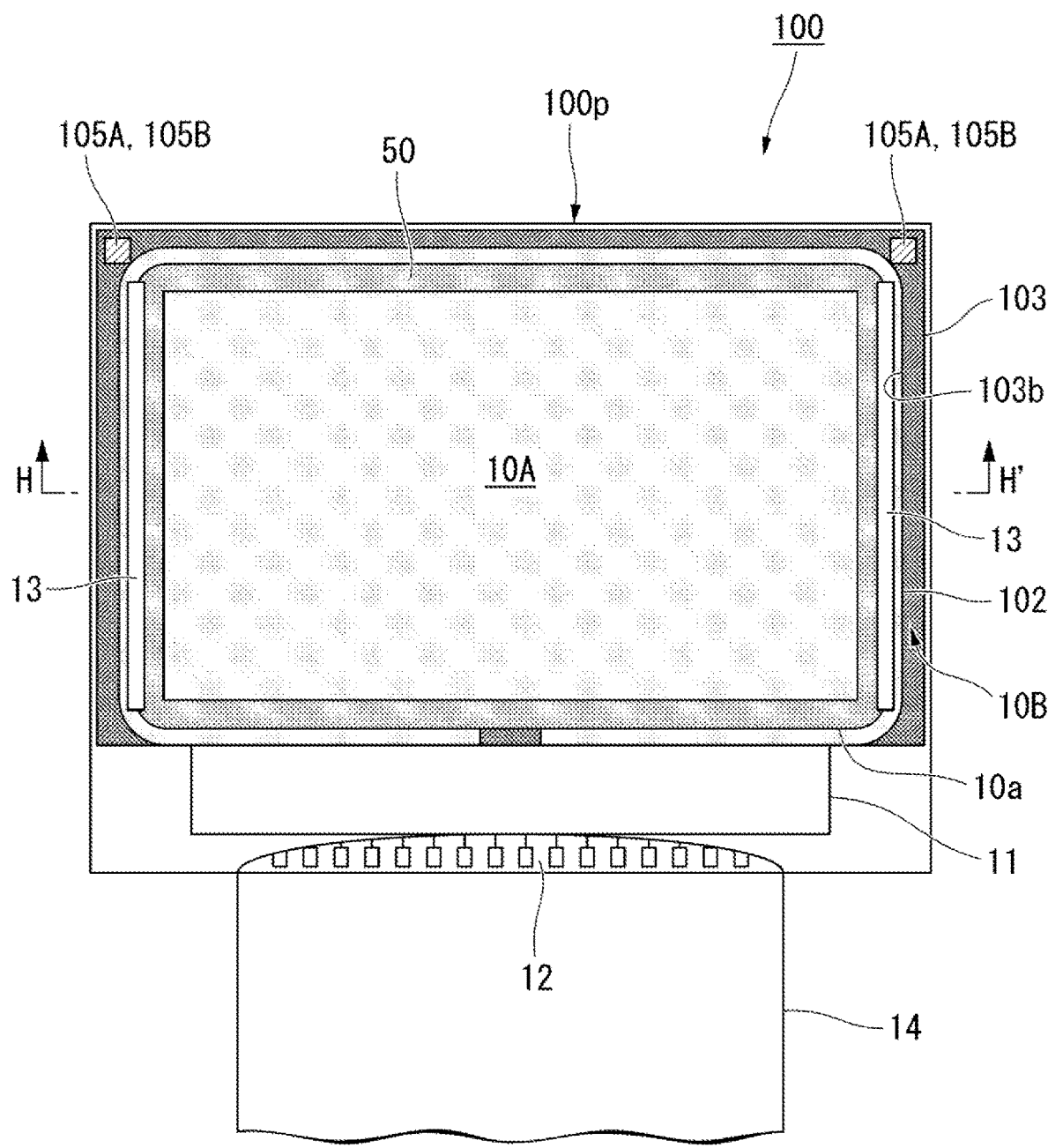
FIG. 1 is a plan view illustrating a configuration example of a liquid crystal device according to a first embodiment of the present disclosure.
Figure 2:
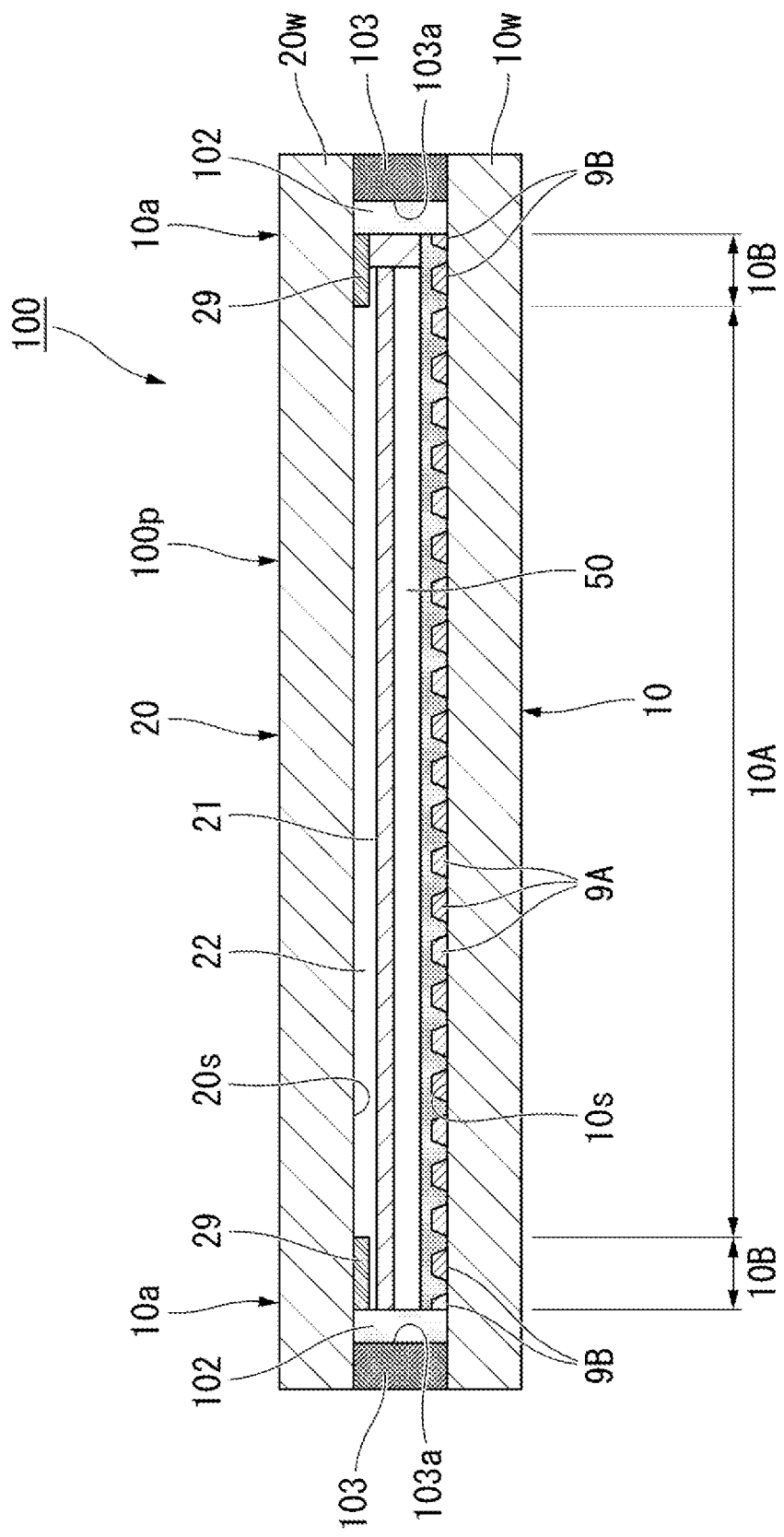
FIG. 2 is an H—H' cross-sectional view of the liquid crystal device illustrated in FIG. 1.
Figure 3:
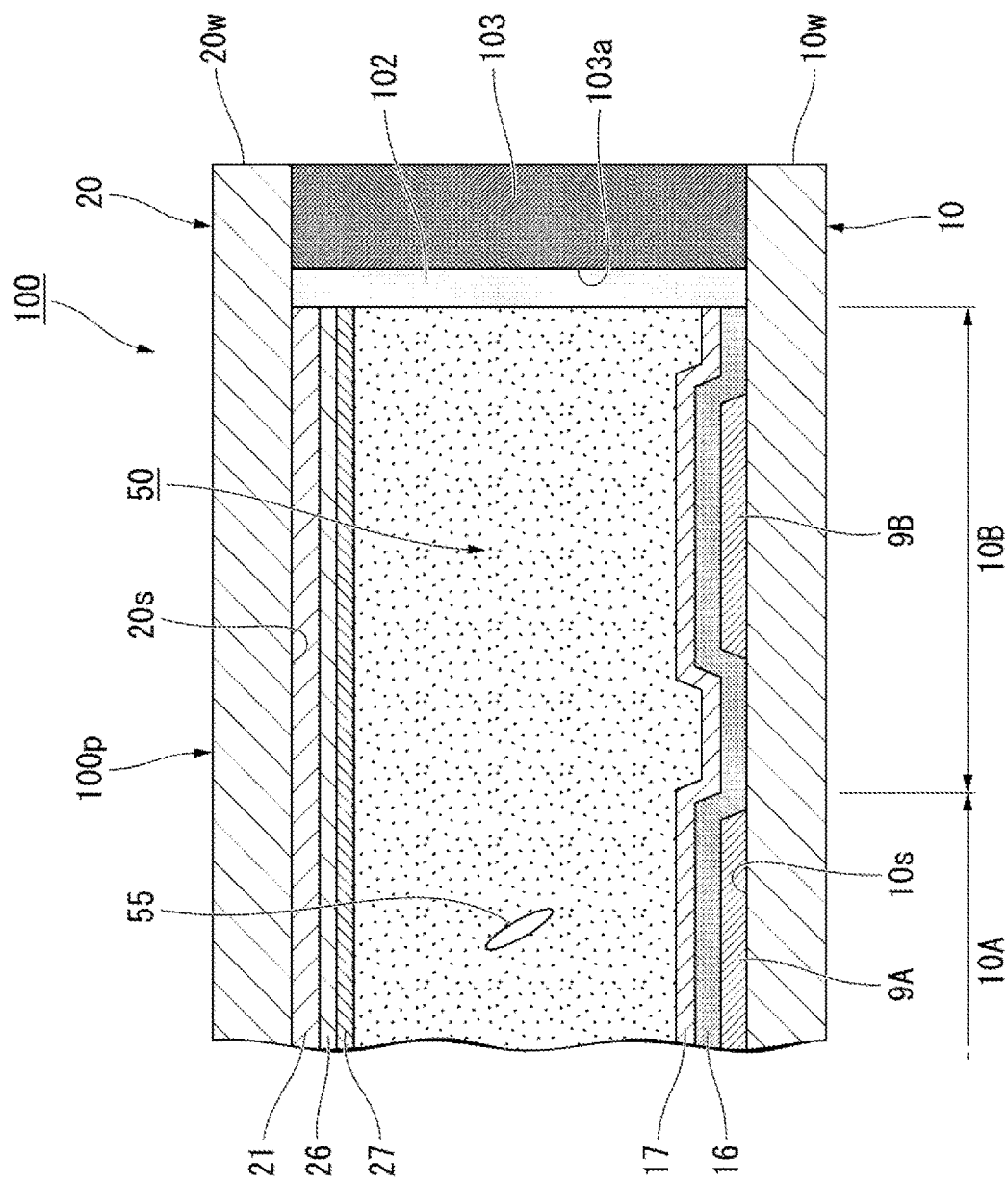
FIG. 3 is a cross-sectional view schematically illustrating a specific configuration example of pixels of the liquid crystal device illustrated in FIG. 1.

FIG. 1 is a plan view illustrating one aspect of a liquid crystal device 100 according to a first embodiment. FIG. 2 is an H—H' cross-sectional view of the liquid crystal device 100 illustrated in FIG. 1. FIG. 3 is an enlarged explanatory diagram schematically illustrating the cross section illustrated in FIG. 2. As illustrated in FIGS. 1, 2, and 3, the liquid crystal device 100 includes a liquid crystal panel 100p in which a first substrate 10 (element substrate) and a second substrate 20 (counter substrate) are bonded with a seal material 103 with a predetermined space therebetween.

The seal material 103 is an adhesive made of a photopolymer, a thermosetting resin, or the like. The seal material 103 is provided in a frame shape along an outer edge of the second substrate 20. A liquid crystal layer 50 is provided in a region surrounded by the seal material 103 between the first substrate 10 and the second substrate 20. The seal material 103 may have a discontinuous portion (not illustrated) that is used as a liquid crystal injection port. After the liquid crystals are injected, the discontinuous portion is closed by a seal material.

The first substrate 10 and the second substrate 20 each are quadrangular in plan view. The first substrate 10, the second substrate 20, and a display area 10A positioned approximately at the center of the liquid crystal device 100 are rectangular in plan view. Here, in the liquid crystal panel 100p, a direction along the long-side direction is defined as an X-axis direction, and a direction along the short-side direction is defined as a Y-axis direction. Corresponding to such a shape, the seal material 103 is provided in a substantially rectangular shape to match the shape of the display area 10A. A rectangular frame-shaped peripheral area 10B is provided between an inner edge 103a of the seal material 103 and an outer edge 10a of the display area 10A.

An adsorption layer 102 containing xerogel is provided around a periphery of the peripheral area 10B. The adsorption layer 102 is mounted so as to be in contact with the inner edge 103a of the seal material 103. In the adsorption layer 102, ionic impurities generated when light hits a liquid crystal material in the liquid crystal layer 50 come into contact with or pass through the adsorption layer 102 made of xerogel, so that only the ionic impurities are selectively adsorbed. Deteriorated substances that are chemically captured can be adjusted by changing a functional group of gel, which is a source of the xerogel. The liquid crystal material itself is not physically adsorbed onto the xerogel due to controlled gel structure.

The first substrate 10 includes a light-transmitting substrate body 10w made of quartz, glass, or the like. Outside of the display area 10A, on one surface 10s of the first substrate 10 facing the second substrate 20, a data line driving circuit 11 and multiple terminals 12 are formed along one first side 10c extending in the X-axis direction of the first substrate 10. Scanning line drive circuits 13 are formed along a pair of second sides 10d adjacent to the first sides 10c in the one surface 10s of the first substrate 10 and extending in the Y-axis direction. A flexible wiring substrate 14 is coupled to the multiple terminals 12. Various potentials and various signals are input to the first substrate 10 via the flexible wiring substrate 14.

Here, when describing a layer formed on the first substrate 10, an upper side or a front surface side means a side opposite to a side on which the substrate body 10w of the first substrate 10 is located (a side on which the second substrate 20 and the liquid crystal layer 50 are located), and a lower side means a side on which the substrate body 10w of the first substrate 10 is located. When describing a layer formed on the second substrate 20, an upper side or a front surface side means a side opposite to a side on which a substrate body 20w of the second substrate 20 is located (a side on which the first substrate 10 and the liquid crystal layer 50 are located), and a lower side means a side on which the substrate body 20w of the second substrate 20 is located.

On the one surface 10s side of the first substrate 10, in the display area 10A, multiple transmissive pixel electrodes 9A made of an indium tin oxide (ITO) film or the like, and transistors (not illustrated) electrically coupled to the respective pixel electrodes 9A are formed in a matrix. A first inorganic alignment film 16 is formed on the upper side of the pixel electrodes 9A.

As illustrated in FIGS. 2 and 3, on the one surface 10s side of the first substrate 10, dummy pixel electrodes 9B formed simultaneously with the pixel electrodes 9A are formed in the quadrangular frame-shaped peripheral area 10B sandwiched between the display area 10A and the adsorption layer 102. In FIG. 2, two rows of dummy pixel electrodes 9B per side are illustrated. Note that the dummy pixel electrodes 9B may be formed in one row or three or more rows per side.

As illustrated in FIG. 2, the second substrate 20 includes the substrate body 20w made of quartz, glass, or the like. A light-transmitting common electrode 21 made of an ITO film is formed on a surface (one surface 20s) of the second substrate 20 on a first substrate 10 side with an insulating film 22, which will be described later, interposed therebetween. The common electrode 21 is formed over an entire surface of the second substrate 20. On a side of the one surface 20s of the second substrate 20, a light shielding layer 29 is formed below the common electrode 21. The light shielding layer 29 is interposed between the one surface 20s of the second substrate 20 and the common electrode 21. A second inorganic alignment film 26 is stacked on a surface of the common electrode 21 on a liquid crystal layer 50 side (see FIG. 3). The light-transmitting insulation film 22 is formed between the light shielding layer 29 and the common electrode 21. The light shielding layer 29 forms a frame portion extending along an outer edge of the display area 10A. That is, an inner edge of the light-shielding layer 29 defines the outer edge of the display area 10A. The light shielding layer 29 is formed at a position overlapping the dummy pixel electrodes 9B in plan view. The light shielding layer 29 may be formed to include a black matrix portion (not illustrated) overlapping inter-pixel region sandwiched between the pixel electrodes 9A adjacent to each other. In addition, in the second substrate 20, lenses may be formed in regions that overlap the respective multiple pixel electrodes 9A in plan view.

As illustrated in FIG. 1, in the first substrate 10, inter-substrate conduction electrodes 105A for electrical conduction between the first substrate 10 and the second substrate 20 are formed in regions overlapping corner portions of the second substrate 20 on the outside of the seal material 103 in plan view. Inter-substrate conduction materials 105B containing conductive particles are placed on the inter-substrate conduction electrodes 105A. The common electrode 21 of the second substrate 20 is electrically coupled to the first substrate 10 via the inter-substrate conduction electrodes 105A and the inter-substrate conduction materials 105B. Therefore, a common potential is applied to the common electrode 21 from the first substrate 10 side.

Specific Configuration of Liquid Crystal Device

As illustrated in FIG. 3, both the first inorganic alignment film 16 and the second inorganic alignment film 26 are diagonally vapor-deposited films of silicon oxide ($SiO_x$ ($x<2$)), (SiO), titanium oxide ($TiO_2$), magnesium oxide (MgO), aluminum oxide ($Al_2O_3$), indium oxide ($In_2O_3$), diantimony trioxide ($Sb_2O_3$), tantalum pentoxide ($Ta_2O_5$), or the like. Thus, the first inorganic alignment film 16 and the second inorganic alignment film 26 have a column structure in which multiple protruding portions called columns are obliquely inclined. Therefore, when liquid crystal molecules (liquid crystal materials 55) such as nematic liquid crystal molecules having negative dielectric anisotropy used in the liquid crystal layer 50 are vertically aligned, the first inorganic alignment film 16 and the second inorganic alignment film 26 can provide major axes of the liquid crystal materials 55 with pretilt angles that are obliquely inclined from the normal to the first substrate 10 and the second substrate 20. In the embodiment, the first inorganic alignment film 16 and the second inorganic alignment film 26 are diagonally vapor-deposited films made of SiO.

The first inorganic alignment film 16 and the second inorganic alignment film 26 are formed on substantially entire surfaces of the first substrate 10 and the second substrate 20, respectively. Organic silane compound layers 17 and 27 are stacked on surfaces of the first inorganic alignment film 16 and the second inorganic alignment film 26 on liquid crystal layer 50 sides, respectively. Therefore, silanol groups of the first inorganic alignment film 16 and the second inorganic alignment film 26 are not in contact with the liquid crystal layer 50. Thus, a photochemical reaction is less likely to occur between the silanol groups of the first inorganic alignment film 16 and the second inorganic alignment film 26 and the liquid crystal layer 50, so that reliability of the liquid crystal device 100 can be improved.

To be more specific, on the surface of the first inorganic alignment film 16, there are dangling bonds of Si atoms or dimer structures (Si—Si bonds) in which Si atoms are bonded to each other. These dangling bonds of Si atoms are likely to be terminated by silanol groups (—Si—OH) due to reactions with moisture or the like in the liquid crystal or atmosphere. Here, the silanol group is highly reactive. However, in the embodiment, the organic silane compound layer 17 is bonded to hydroxyl group (—OH) portions of the surface of the first inorganic alignment film 16 using a silane coupling agent such as organic siloxane (decyltrimethoxysilane). Therefore, the silanol groups of the first inorganic alignment film 16 and the liquid crystal layer 50 are not in contact with each other.

The silane coupling agent used here generates silanols (Si—OH) by hydrolysis, and then silanols are gradually condensed with each other to generate siloxane bonds (Si—O—Si), thereby forming the organic silane compound layer 17. Further, the silane coupling agent forms a strong bond with the surface of the inorganic oxide such as the first inorganic alignment film 16 to form a self-assembled monolayer. Examples of such a silane coupling agent include n-hexyltrimethoxysilane, n-hexyltriethoxysilane, cyclohexylmethyldimethoxysilane, n-octyltriethoxysilane, and n-decyltrimethoxysilane. As the silane coupling agent, a silane coupling agent containing a fluorine atom (F) in the hydrophobic organic functional group R can be used. No matter which silane coupling agent is used, the organic silane compound layer 17 has water repellency. The organic silane compound layer 27 formed on the second inorganic alignment film 26 also has the same configuration as the organic silane compound layer 17. Therefore, the adsorption layer 102 is provided between the first inorganic alignment film 16 and the second inorganic alignment film 26 so as to surround the liquid crystal layer 50, and the seal material 103 is provided on the side of the adsorption layer 102 that is not in contact with the liquid crystal layer 50, thereby bonding the first substrate 10 and the second substrate 20.

Method for Manufacturing Liquid Crystal Device

In manufacturing the liquid crystal device 100 in the embodiment, in a first manufacturing method, for example, a step of bonding the first substrates 10 and the second substrates 20 in states of large mother substrates is performed, and then the mother substrate for the second substrates 20 is cut to expose the liquid crystal injection ports. Subsequently, after performing a liquid crystal injection step, a sealing step is performed, and then, the mother substrate for the first substrates 10 is cut along planned dividing lines to obtain single-sized liquid crystal devices 100.

In a second manufacturing method, only the first substrates 10 are configured in a large-sized mother substrate, and then the single-sized second substrates 20 are bonded to the mother substrate. Subsequently, after performing a liquid crystal injection step, a sealing step is performed, and then, the mother substrate is cut along planned dividing lines to obtain single-sized liquid crystal devices 100.

Next, action and effect of the liquid crystal device 1 will be described.

As illustrated in FIGS. 1 to 3, the liquid crystal device 100 in the embodiment includes the first substrate 10, the second substrate 20, the seal material 103 disposed between the first substrate 10 and the second substrate 20 and at a periphery in plan view, the liquid crystal layer 50 disposed between the first substrate 10 and the second substrate 20 and an inside surrounded by the seal material 103 in plan view, and the adsorption layer 102 containing xerogel disposed along at least part of the seal material 103. Thus, in the embodiment, by placing the adsorption layer 102 containing xerogel outside the display area 10A of the liquid crystal display panel 100p, ionic impurities generated due to deterioration of the liquid crystal can be removed.

For example, in the liquid crystal device 100 mounted on a projection display device or the like, when strong light from a light source enters the display area 10A, liquid crystals in the display area 10A are heated. Specific gravities of the liquid crystals decrease when heated, and the liquid crystals diffuse from the central portion of the display area 10A to the periphery. In particular, among ionic impurities that are generated when the liquid crystals are exposed to strong light, small ones have high mobility and diffuse faster than the liquid crystals. Thus, the ionic impurities can be efficiently captured by the adsorption layer 102. Therefore, concentration of ionic impurities in the liquid crystal in the display area 10A can be maintained low. Accordingly, when an image is displayed, display irregularities such as spots caused by aggregation of ionic impurities at corners of the display area 10A are less likely to occur. Further, even when the liquid crystal in the display area 10A deteriorates due to a photochemical reaction caused by light from the light source, a time until an entire liquid crystal in the display area 10A deteriorates can be extended.

As described above, in the liquid crystal device 100 in the embodiment, the adsorption layer 102 containing xerogel is disposed on the inner edge 103a of the seal material 103 on the liquid crystal layer 50 side, so that when strong light source light enters the liquid crystal layer 50, the xerogel, which is the adsorption layer 102, can capture ionic impurities that move in accordance with movement of the liquid crystals, whose specific gravities decrease when heated and diffuse from the center of the display area 10A to the periphery, thereby reducing influence of deterioration of the liquid crystal without increasing size of the liquid crystal display panel 100p. That is, in the embodiment, it is no longer necessary to secure a space for placing the circulating flow path for circulating the ionic impurities as in the related art, and the display area 10A can be enlarged and the liquid crystal display panel 100p can be downsized, as described above.

Further, since there is no need to consider deterioration of the gel due to light and its effect on the liquid crystal, it is possible to manufacture liquid crystal panels that require high light resistance, such as liquid crystal panels for projectors.

In addition, in the liquid crystal device 100 in the embodiment, a method for mounting the xerogel can be freely determined depending on a method for producing hydrogel or organogel that is a source of the xerogel. For example, a thin gel film can be obtained by coating a glass substrate with a gel solution and then producing a gel. By patterning this with UV light or the like, the gel can be placed around the display area 10A as in the embodiment (see a modified example described later), or the gel can be placed between pixels of the liquid crystal panel 100p as in a second embodiment or a third embodiment described later.

According to at least one embodiment described above, by placing the xerogel, which is contained in the adsorption layer 102, outside the display area 10A of the liquid crystal display panel 100p, the ionic impurities caused by the deterioration of the liquid crystal can be removed by the xerogel, and the influence of the deterioration of the liquid crystal can be reduced without increasing the size of the liquid crystal display panel 100p.

Next, other embodiments and a modified example of the liquid crystal device and the electronic apparatus according to the embodiment will be described. Note that components having the same functions as the components in the first embodiment described above are denoted by the same reference numerals, and detailed descriptions thereof will be omitted since the explanations are redundant.

Modified Example of First Embodiment

Figure 4:
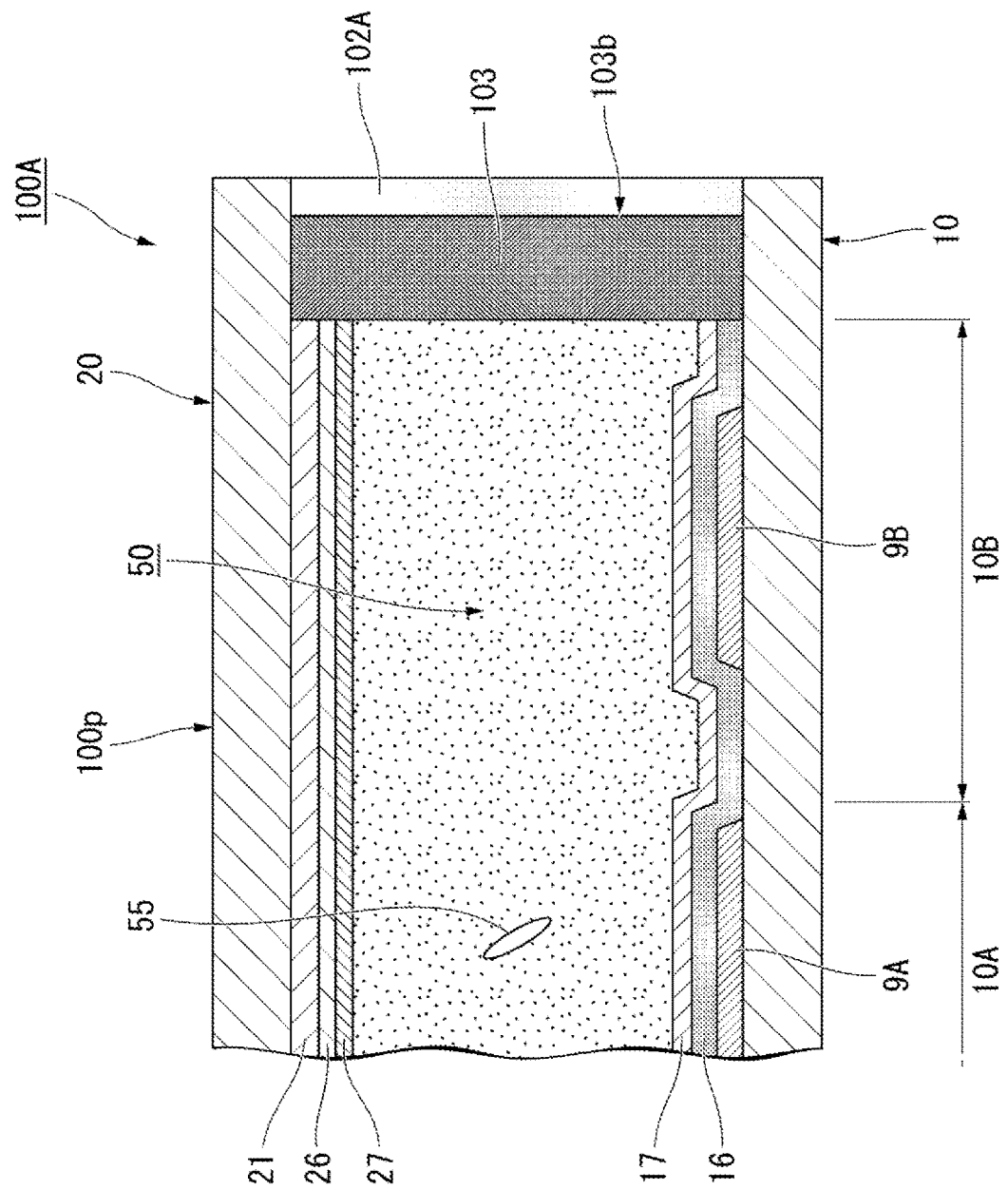
FIG. 4 is a cross-sectional view schematically illustrating a specific configuration example of pixels of the liquid crystal device according to a modified example of the first embodiment of the present disclosure.

FIG. 4 is a cross-sectional view schematically illustrating a specific configuration example of pixels of a liquid crystal device 100A according to a modified example of the first embodiment, and corresponding to FIG. 3 for the first embodiment described above. As illustrated in FIG. 4, an adsorption layer 102A is mounted around a periphery of the seal material 103. Other configurations are the same as those in the first embodiment.

The adsorption layer 102A containing xerogel is provided around the periphery of the peripheral area 10B. The adsorption layer 102A according to the modified example is mounted so as to be in contact with an outer edge 103b of the seal material 103. A function of the adsorption layer 102A is similar to the adsorption layer 102 in the first embodiment. That is, in the adsorption layer 102A, ionic impurities generated when light hits the liquid crystal material of the liquid crystal layer 50 come into contact with or pass through the adsorption layer 102A, so that only the ionic impurities are selectively adsorbed.

In the liquid crystal device 100A according to the modified example configured as described above, when the ionic impurities diffused as in the first embodiment come into contact with the seal material 103, some of the ionic impurities seep out from the seal material 103 and come into contact with the adsorption layer 102A, thereby being contained in the adsorption layer 102A. That is, the adsorption layer 102A containing xerogel is disposed on the outer edge 103b of the seal material 103, so that when strong light source light enters the liquid crystal layer 50, the xerogel, which is the adsorption layer 102A, can capture ionic impurities that move in accordance with movement of the liquid crystals, whose specific gravities decrease when heated and diffuse from the center of the display area 10A to the periphery, thereby reducing the influence of deterioration of the liquid crystal without increasing size of the liquid crystal display panel 100p.

In addition, in the modified example, since the adsorption layer 102A is provided in a peripheral area of the seal material 103, in addition to preventing deterioration of the adsorption layer 102A due to strong light, it is possible to prevent deterioration of the liquid crystal caused by the adsorption layer 102A.

Second Embodiment

Figure 5:
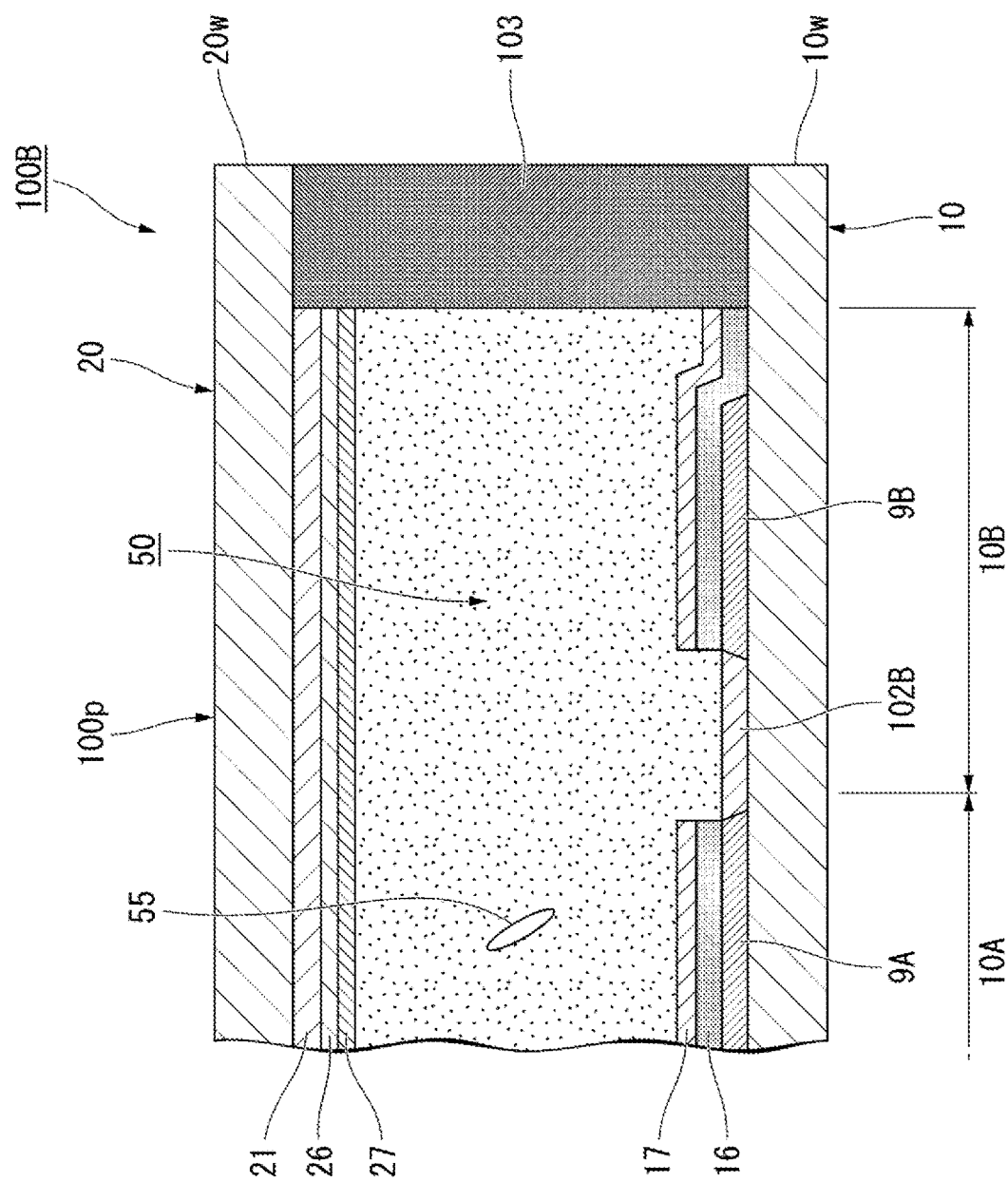
FIG. 5 is a cross-sectional view schematically illustrating a specific configuration example of pixels of a liquid crystal device according to a second embodiment of the present disclosure.

Next, a liquid crystal device according to a second embodiment will be described in detail. FIG. 5 is a cross-sectional view schematically illustrating a specific configuration example of pixels of a liquid crystal device 100B according to the second embodiment, and corresponding to FIG. 3 for the first embodiment described above. As illustrated in FIG. 5, in the liquid crystal device 100B in the second embodiment, dummy pixel electrodes 9B formed simultaneously with pixel electrodes 9A are formed in a quadrangular frame-shaped peripheral area 10B sandwiched between a display area 10A and a seal material 103. An adsorption layer 102B is provided between the pixel electrode 9A and the dummy pixel electrode 9B. The adsorption layer 102B is placed closer to a first substrate 10 than a first inorganic alignment film 16 and an organic silane compound layer 17. The first inorganic alignment film 16 and the organic silane compound layer 17 are not provided above the adsorption layer 102B on a liquid crystal layer 50 side. Other configurations are the same as those in the first embodiment.

Although FIG. 5 illustrates a configuration in which the adsorption layer 102B is provided only between the pixel electrode 9A and the dummy pixel electrode 9B, the adsorption layer 102B may be provided between the pixel electrodes 9A and 9A as in a third embodiment described later.

According to the liquid crystal device 100B in the second embodiment, when strong light source light enters the liquid crystal layer 50, the xerogel, which is the adsorption layer 102B, can capture ionic impurities that move in accordance with movement of the liquid crystals, whose specific gravities decrease when heated and diffuse from the center of the display area 10A to a periphery, thereby reducing influence of deterioration of the liquid crystal without increasing size of a liquid crystal display panel 100p. In the second embodiment, by providing the adsorption layer 102B between the pixel electrode 9A and the dummy pixel electrode 9B, a contact area between the adsorption layer 102B and the liquid crystal layer 50 can be increased, thereby efficiently adsorbing the ionic impurities.

Also in the second embodiment, it is no longer necessary to secure a space for placing the circulating flow path for circulating the ionic impurities as in the related art, and the display area 10A can be enlarged and the liquid crystal display panel 100p can be downsized, as described above.

In addition, in this case, since the adsorption layer 102B is provided only in a small region between the pixel electrode 9A and the dummy pixel electrode 9B, deterioration of the adsorption layer 102B itself due to light can be suppressed.

In addition, in the liquid crystal device 100B according to the embodiment, the adsorption layer 102B is placed closer to the first substrate 10 than the first inorganic alignment film 16 and the organic silane compound layer 17, and is placed at a position not overlapping the first inorganic alignment film 16 or the organic silane compound layer 17 in plan view. Therefore, the adsorption layer 102B easily comes into contact with the liquid crystal layer 50 and can efficiently adsorb the ionic impurities.

Third Embodiment

Figure 6:
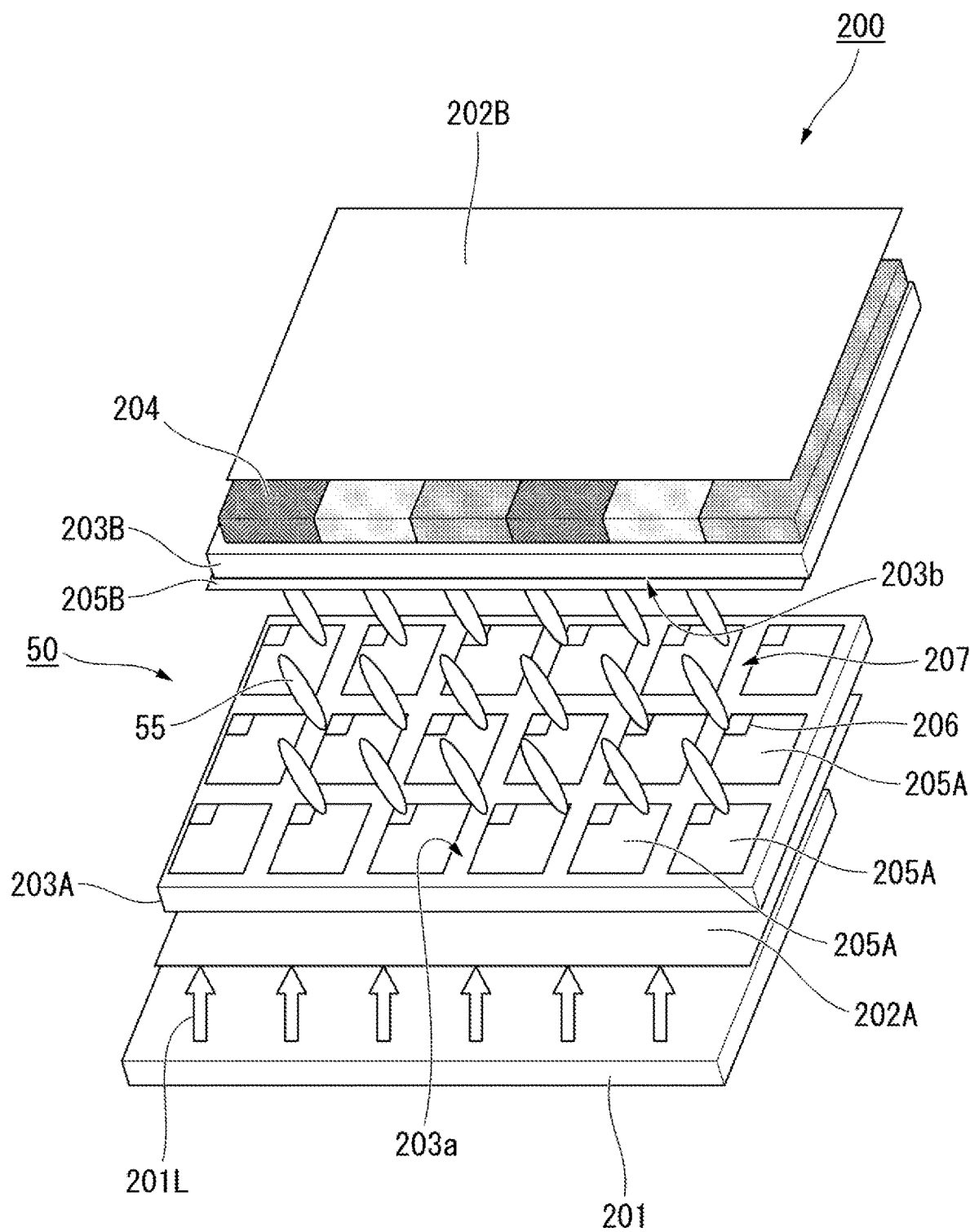
FIG. 6 is an exploded perspective view illustrating a configuration example of a liquid crystal display according to a third embodiment of the present disclosure.

Next, a liquid crystal device according to a third embodiment will be described in detail. FIG. 6 is an exploded perspective view illustrating a configuration example of a transmissive TFT liquid crystal display (liquid crystal display 200) according to the third embodiment. As illustrated in FIG. 6, the liquid crystal display 200 (liquid crystal device) according to the third embodiment includes a backlight light source 201, a first polarizing plate 202A, a second polarizing plate 202B, a first glass substrate 203A, a second glass substrate 203B, a color filter 204, and a liquid crystal layer 50.

The first polarizing plate 202A is provided on a surface of the backlight light source 201 facing the first glass substrate 203A. The backlight light source 201 emits light 201L toward the first polarizing plate 202A. The color filter 204 is provided on a surface of the second polarizing plate 202B facing the second glass substrate 203B. The first glass substrate 203A and the second glass substrate 203B are provided between the first polarizing plate 202A and the color filter 204. In the embodiment, the color filter 204 has a configuration in which three RGB color filters are arranged side by side. The color filters are not limited to those with the three colors of RGB, and may have a configuration in which color filters of multiple colors other than the three colors are arranged side by side, or a monochrome color filter may be used.

On a surface 203a of the first glass substrate 203A facing the second glass substrate 203B, multiple pixel electrodes 205A (first pixel electrodes and second pixel electrodes) are arranged vertically and horizontally, and each of the pixel electrodes includes a TFT. A counter electrode 205B is provided on a surface 203b of the second glass substrate 203B facing the first glass substrate 203A. The liquid crystal layer 50 is sandwiched between the first glass substrate 203A and the second glass substrate 203B. On the surface 203a of the first glass substrate 203A facing the second glass substrate 203B, a gel film 207 (adsorption layer) is patterned between the pixel electrodes 205A and 205A.

In the liquid crystal display 200 according to the third embodiment, when strong light source light enters the liquid crystal layer 50, the gel film 207 patterned between the pixel electrodes 205A and 205A can capture ionic impurities that move in accordance with movement of the liquid crystals, whose specific gravities decrease when heated and diffuse from the center of the display area 10A to a periphery, thereby reducing influence of deterioration of the liquid crystal without increasing size of a liquid crystal display panel 100p. In the third embodiment, by providing the gel film 207 that forms the adsorption layer between the pixel electrodes 205A and 205A, a contact area between the gel film 207 and the liquid crystal layer 50 can be increased, thereby efficiently adsorbing the ionic impurities.

Also in the third embodiment, it is no longer necessary to secure a space for placing the circulating flow path for circulating the ionic impurities as in the related art, and the display area 10A can be enlarged and the liquid crystal display panel 100p can be downsized, as described above.

Further, in the liquid crystal display 200 according to the third embodiment, concentration of ionic impurities in the liquid crystal layer 50 can be maintained low. Therefore, even when the liquid crystal deteriorates due to a photochemical reaction caused by light from the backlight light source 201, a time until an entire liquid crystal of the liquid crystal layer 50 deteriorates can be extended. In addition, by placing the gel film 207 in a film form between the pixel electrodes 205A instead of covering an entire first glass substrate 203A, photodeterioration of the gel due to electrode reactions can be reduced.

Although several embodiments of the present disclosure have been described, these embodiments are presented as examples, and are not intended to limit the scope of the disclosure. These embodiments can be performed in various other forms, and various omissions, substitutions, and changes can be made without departing from the gist of the disclosure. These embodiments and modifications thereof are included within the scope and gist of the disclosure as well as the scope of the disclosure in the claims and equivalents thereto.

As mentioned above, in the first embodiment, the adsorption layer 102 is placed on the inner edge 103a of the seal material 103, and in the modified example, the adsorption layer 102A is placed on the outer edge 103b of the seal material 103, but the position of the adsorption layer relative to the seal material 103 is not limited thereto. For example, the adsorption layer may be placed at a corner of the seal material 103.

Further, the adsorption layer 102B according to the second embodiment may be placed at a position overlapping the light shielding layer 29 disposed between the pixel electrode 9A and the dummy pixel electrode 9B in plan view.

The electronic apparatus including the liquid crystal device to which the present disclosure is applied is not limited to the projection display device in the above-described embodiment. A liquid crystal device to which the present disclosure is applied may be used, for example, in electronic apparatus such as a projection head up display (HUD), a head-mounted display (HMD), a personal computer, a digital still camera, and a liquid crystal television.

A liquid crystal device according to an aspect of the present disclosure may have the following configuration.

A liquid crystal device according to an aspect of the present disclosure includes a first substrate, a second substrate, a seal material disposed between the first substrate and the second substrate at a periphery in plan view, a liquid crystal layer disposed between the first substrate and the second substrate and an inside surrounded by the seal material in plan view, and an adsorption layer containing xerogel disposed along at least part of the seal material.

In the liquid crystal device according to an aspect of the present disclosure, the adsorption layer may be disposed on a side surface of the seal material on a side of the liquid crystal layer.

In the liquid crystal device according to an aspect of the present disclosure, the adsorption layer may be disposed on a side surface of the seal material on a side opposite to the liquid crystal layer.

In the liquid crystal device according to an aspect of the present disclosure, the adsorption layer may be disposed at a corner of the seal material.

A liquid crystal device according to an aspect of the present disclosure includes a first substrate, a second substrate, a seal material disposed between the first substrate and the second substrate at a periphery in plan view, a liquid crystal layer disposed between the first substrate and the second substrate and an inside surrounded by the seal material in plan view, a pixel electrode disposed between the first substrate and the liquid crystal layer, a dummy pixel electrode disposed closer to the seal material than the pixel electrode, and an adsorption layer containing xerogel disposed between the pixel electrode and the dummy pixel electrode in plan view.

In the liquid crystal device according to an aspect of the present disclosure, the first substrate may include an alignment film and the adsorption layer may be disposed closer to the first substrate than the alignment film.

In the liquid crystal device according to an aspect of the present disclosure, the first substrate may include an alignment film and the adsorption layer may be disposed at a position not overlapping the alignment film.

In the liquid crystal device according to an aspect of the present disclosure, the adsorption layer may be disposed at a position overlapping a light shielding layer disposed between the pixel electrode and the dummy pixel electrode in plan view.

A liquid crystal device according to an aspect of the present disclosure includes a first substrate, a second substrate, a liquid crystal layer disposed between the first substrate and the second substrate, a first pixel electrode disposed between the first substrate and the liquid crystal layer, a second pixel electrode disposed between the first substrate and the liquid crystal layer and disposed in parallel with the first pixel electrode in plan view, and an adsorption layer containing xerogel disposed between the first pixel electrode and the second pixel electrode in plan view.

In the liquid crystal device according to an aspect of the present disclosure, the first substrate may include an alignment film and the adsorption layer may be disposed closer to the first substrate than the alignment film.

In the liquid crystal device according to an aspect of the present disclosure, the first substrate may include an alignment film and the adsorption layer may be disposed at a position not overlapping the alignment film.

In the liquid crystal device according to an aspect of the present disclosure, the adsorption layer may be disposed at a position overlapping a light shielding layer disposed between the first pixel electrode and the second pixel electrode.

An electronic apparatus according to an aspect of the present disclosure may be configured as follows.

An electronic apparatus according to an aspect of the present disclosure includes the liquid crystal device according to the above-described aspect.

What is claimed is:

1. A liquid crystal device comprising:
   a first substrate including:
      a first alignment film, and
      a first silane compound layer covering the first alignment film;
   a second substrate including:
      a second alignment film, and
      a second silane compound layer covering the second alignment film;
   a seal material disposed between the first substrate and the second substrate;
   a liquid crystal layer disposed between the first substrate and the second substrate and an inside surrounded by the seal material in plan view; and
   an adsorption layer containing xerogel disposed on a side surface of the seal material on a side of the liquid crystal layer, the adsorption layer being disposed in contact with a side surface of the first alignment film, a side surface of the first silane compound layer, a side surface of the second alignment film, and a side surface of the second silane compound layer.

2. The liquid crystal device according to claim 1, wherein the adsorption layer is disposed on a corner of the seal material.

3. A liquid crystal device comprising:
   a first substrate;
   a second substrate;
   a seal material disposed between the first substrate and the second substrate;
   a liquid crystal layer disposed between the first substrate and the second substrate and an inside surrounded by the seal material in plan view;
   a pixel electrode disposed between the first substrate and the liquid crystal layer;
   a dummy pixel electrode disposed closer to the seal material than the pixel electrode; and
   an adsorption layer containing xerogel disposed between an outer edge of the pixel electrode and an inner edge of the dummy pixel electrode in plan view.

4. The liquid crystal device according to claim 3, wherein the first substrate includes an alignment film, and the adsorption layer is disposed closer to the first substrate than the alignment film.

5. The liquid crystal device according to claim 3, wherein the first substrate includes an alignment film, and the adsorption layer is disposed at a position not overlapping the alignment film.

6. The liquid crystal device according to claim 3, wherein the adsorption layer is disposed at a position overlapping a light shielding layer disposed between the pixel electrode and the dummy pixel electrode in plan view.

7. A liquid crystal device comprising:
   a first substrate;
   a second substrate;
   a liquid crystal layer disposed between the first substrate and the second substrate;
   a first pixel electrode disposed between the first substrate and the liquid crystal layer;
   a second pixel electrode disposed between the first substrate and the liquid crystal layer and disposed in parallel with the first pixel electrode in plan view; and
   an adsorption layer containing xerogel disposed between the first pixel electrode and the second pixel electrode in plan view,
   wherein the adsorption layer is disposed between the first substrate and the liquid crystal layer.

8. The liquid crystal device according to claim 7, wherein the first substrate includes an alignment film, and the adsorption layer is disposed closer to the first substrate than the alignment film.

9. The liquid crystal device according to claim 7, wherein the first substrate includes an alignment film, and the adsorption layer is disposed at a position not overlapping the alignment film.

10. The liquid crystal device according to claim 7, wherein the adsorption layer is disposed at a position overlapping a light shielding layer disposed between the first pixel electrode and the second pixel electrode.

11. An electronic apparatus comprising the liquid crystal device according to claim 1.

* * * * *